United States Patent [19]

Fukunaga

[11] 4,313,584

[45] Feb. 2, 1982

[54] STRUCTURE FOR MOUNTING A METER ON AN INSTRUMENT PANEL OF MOTOR VEHICLES

[75] Inventor: Yukio Fukunaga, Yokohama, Japan

[73] Assignee: Nissan Motor Company, Limited, Yokohama, Japan

[21] Appl. No.: 77,111

[22] Filed: Sep. 19, 1979

[30] Foreign Application Priority Data

Sep. 21, 1978 [JP] Japan .............................. 53-136270
Nov. 7, 1978 [JP] Japan .............................. 53-116232

[51] Int. Cl.³ ............................................. G12B 9/00
[52] U.S. Cl. ................................ 248/27.3; 312/242
[58] Field of Search ................ 248/27.1, 27.3, 205R; 211/26; 174/58, 48; 312/242, 346; 361/346; 324/156

[56] References Cited

U.S. PATENT DOCUMENTS

| | | | |
|---|---|---|---|
| 2,097,480 | 11/1937 | Visser | 312/242 X |
| 2,146,701 | 2/1939 | Peterson | 248/27.1 X |
| 2,375,714 | 5/1945 | Wild | 312/242 X |
| 3,008,790 | 11/1961 | Simons | 312/346 X |
| 3,174,576 | 3/1965 | Woofter et al. | 180/90 |
| 3,450,454 | 6/1969 | Anders | 211/26 X |
| 3,600,051 | 8/1971 | Boer | 312/242 X |
| 3,620,404 | 11/1971 | Grasso | 312/242 X |
| 3,708,850 | 1/1973 | Martin | 248/27.1 |
| 3,793,563 | 2/1974 | Brefka | 248/27.3 X |

FOREIGN PATENT DOCUMENTS 1158972 7/1969 United Kingdom .

Primary Examiner—J. Franklin Foss
Attorney, Agent, or Firm—Lowe, King, Price & Becker

[57] ABSTRACT

A structure for mounting a meter includes an instrument panel having a wall recessed on the instrument panel, a meter inserted in the recessed wall through the opening of the instrument panel, means for supporting the meter on the bottom of the recessed wall, the supporting means including a first projection formed on the bottom of the meter, the first projection being in contact with the bottom of the recessed wall, means for positioning the meter at the front portion of the recessed wall, and means for locking the meter in the recessed wall at the top thereof, the locking means including a second projection provided on the top of the meter and an engaging member which can be resiliently deformed when the meter becomes engaged with or disengaged from the second projection.

12 Claims, 11 Drawing Figures

STRUCTURE FOR MOUNTING A METER ON AN INSTRUMENT PANEL OF MOTOR VEHICLES

BACKGROUND OF THE INVENTION

The present invention relates to a structure for mounting a meter, and more particularly a structure for mounting a meter on an instrument panel or board of an automotive vehicle.

FIG. 1 illustrates a typical conventional structure for mounting a meter on an instrument panel of an automobile. The instrument panel is fitted with various meters. For example, a meter 1 is formed integrally of a housing 2 and a hood 3. An instrument panel 4 of an automobile has at its front an opening 5 for inserting therethrough the meter 1. The top and bottom of the hood 3 are fixed to the instrument panel 4 by means of tapping screws 6 and 7, respectively. The upper screws 6 are screwed from below so that the screws 6 can not be seen from a driver. The lower screws 7 are screwed from the front of the instrument panel 4 but hided by a decorative sheet 8 or the like. A pad 9 covers the front of the instrument panel 4. Spring nuts 10 are screwed with the tapping screws 6 and 7. Designated as 11 is a connector of a multipolar type for detachably connecting electrical conductors between the meter 1 and a power source. The connector 11 is fitted after the meter 1 is mounted.

As can be seen from the foregoing, such a conventional structure requires many parts such as the tapping screws, the spring nuts, the decorative sheets and others. In addition, positioning and screwing the screws into the nuts are very cumbersome. Because the meters are held in their positions solely by means of those screws, the supporting of the meters and particularly their rear end is insufficient for preventing their vibrations which may impair their functions. Such vibrations loosen the screws, and may cause the meter to fall off from the instrument panel.

SUMMARY OF THE INVENTION

Accordingly, it is a main object of the present invention to provide a structure for mounting a meter, for example, on an instrument panel of an automotive vehicle in which the meter can be easily mounted or dismounted when desired but does not displace nor fall off unexpectedly.

It is another object of the present invention to provide a structure for mounting a meter in which the meter can be precisely fitted and securely held in its position.

It is still another object of the present invention to provide a structure for mounting a meter in which the mounting structure and more particularly catching means thereof can be easily moulded.

According to the present invention, there is provided a structure for mounting a meter on an instrument panel, for example, of an automotive vehicle, including a fitted meter, supporting means, positioning means and locking means. The instrument panel has a wall recessed on the instrument panel at its front. The meter is fitted in the recessed wall of the panel through the opening thereof. The meter is also supported by the supporting means on the bottom of the recessed wall. The supporting means includes a first projection formed on the bottom of the meter. The first projection is in contact with the bottom of the recessed wall in the instrument panel. The meter is positioned at the front portion thereof by means of the positioning means. The meter is also locked by the locking means in the recessed wall at the top thereof. The locking means includes a second projection on the top of the meter and an engaging member. This engaging member is made of such materials as can be resiliently deformed when the engaging member gets engaged with or disengaged from the second projection.

BRIEF DESCRIPTION OF THE DRAWINGS

These and other objects, features and advantages of the present invention will be apparent from the following description when read in connection with the accompanying drawings in which.

DETAILED DESCRIPTION OF THE PREFERRED EMBODIMENTS

Figure 1:
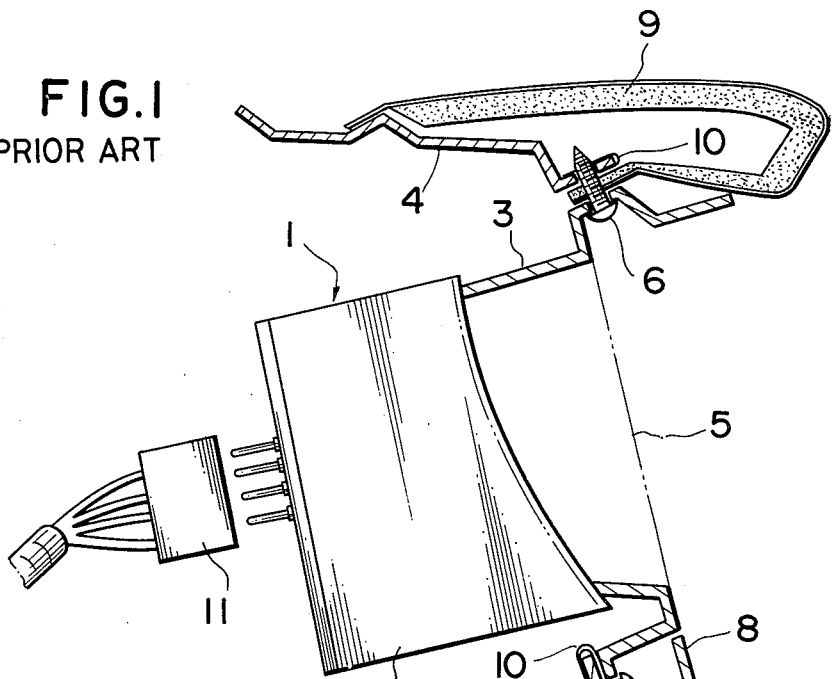
FIG. 1 is a sectional view showing a prior art structure for mounting a meter on an instrument panel of an automobile.
Figure 2:
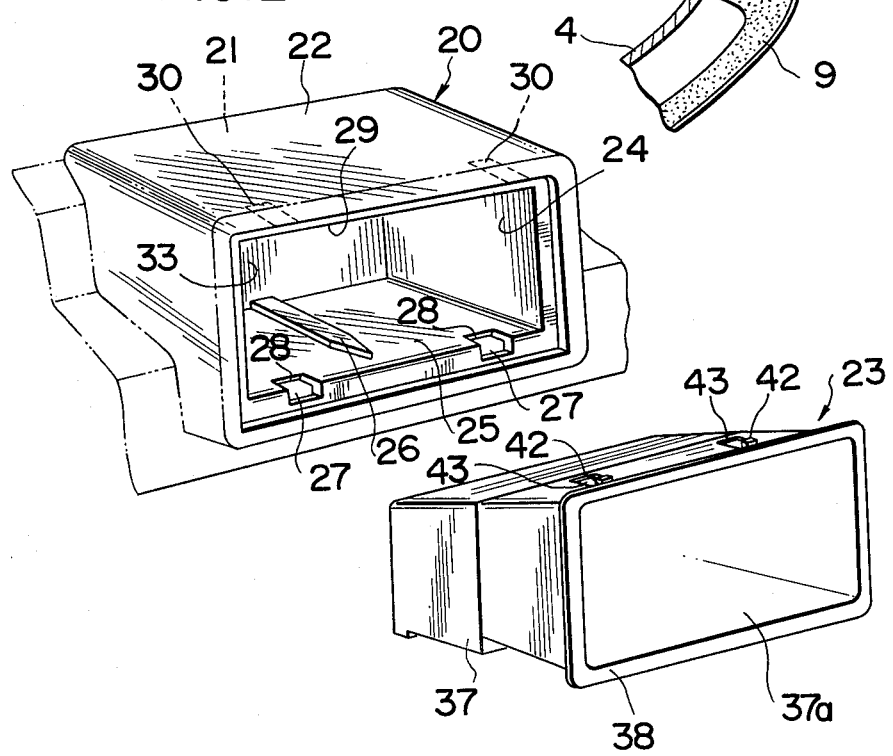
FIG. 2 is a schematic perspective view showing a structure for mounting a meter according to a preferred embodiment of the present invention.
Figure 3:
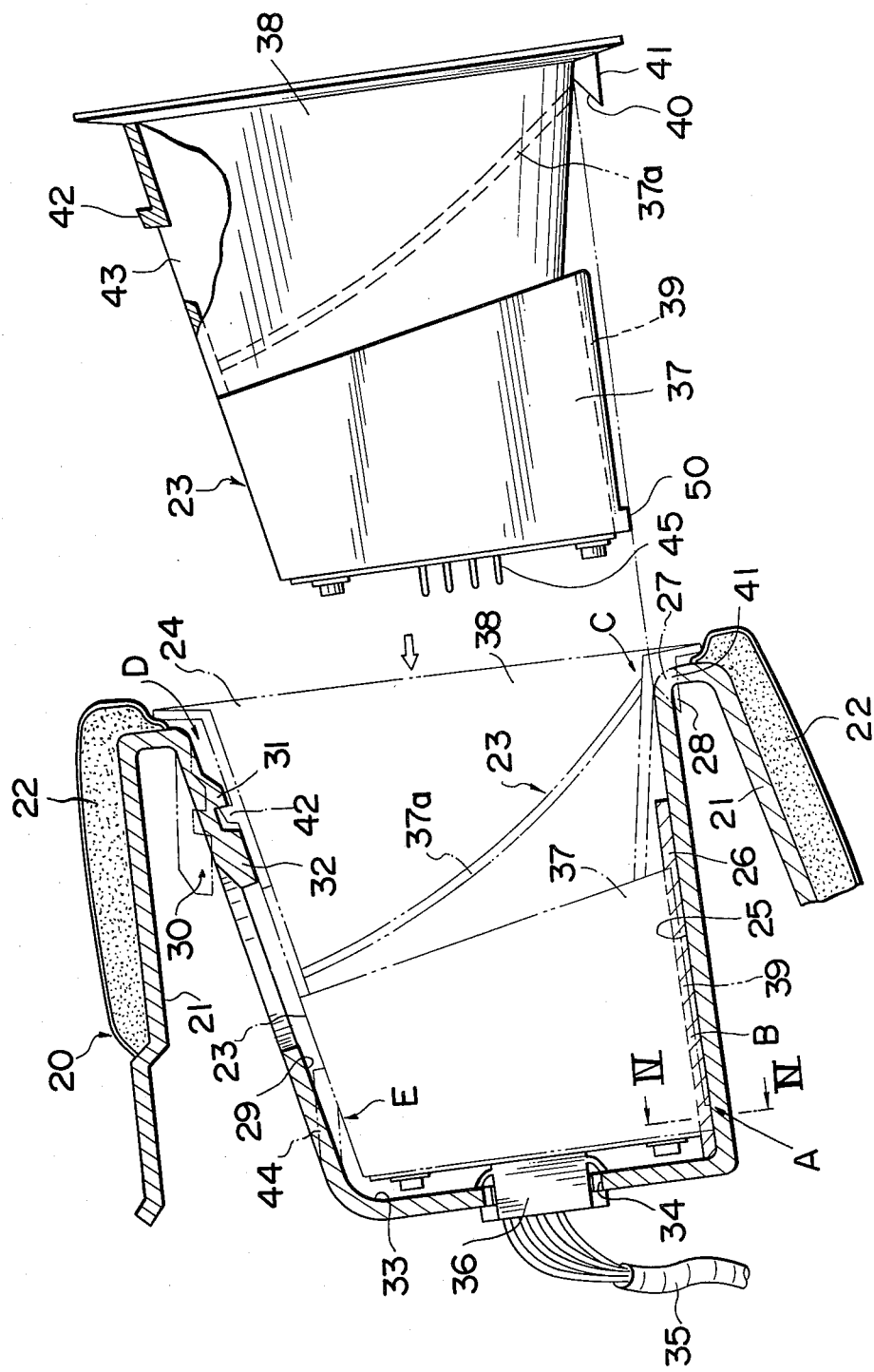
FIG. 3 illustrates a section of the mounting structure as illustrated in FIG. 2.

Referring now to FIGS. 2 and 3, a meter board 20 is composed of an instrument panel 21 and a pad 22 covering the front surface thereof. The instrument panel 21 has a recessed wall 24 with its opening. The recessed wall 24 is shaped like a frustrum of pyramid. A meter 23 is inserted into the recessed wall 24 through the opening thereof. The top or roof 29 of the recessed wall 24 is slightly inclined downwards so that the recessed wall 24 should be narrowed toward its back. A strip-shaped guide 26 is formed integrally with the bottom 25 of the recessed wall 24 at the center thereof for slidably inserting the meter 23 along the inserting direction of the meter 23. (A cross section of the guide 26 is by way of example illustrated in FIG. 4.) Two positioning holes 27 are bored on the right and left sides at the front end of the bottom wall 25, respectively. As best illustrated in FIG. 3, positioning ends 28 of the portions defining the holes 27 are tapered.

Provided at the right and left positions on the front edge of the top wall 29 are engaging members 30 which are notched into a tongue shape, protruding toward the back of the recessed wall 24. The engaging members 30 each includes a downward projection 31 at its intermediate position, a thick operating part 32 and a groove therebetween, as illustrated in FIG. 3. At the center of the back 33 of the recessed wall, a hole 34 is bored. A connector 36 is attached in the hole 34, being connected to a harness 35.

A hood 38 is provided ahead of a front glass 37a in the meter 23 which is incorporated into a housing 37. The hood 38 is integrally formed with the housing 37. The top of the hood 38 is given some space margin therein. A downward projection 50 is formed along the foremost end edge of the bottom of the housing 37. The projection 50 is in direct contact with the bottom wall 25 and supported thereby when the meter is fitted. Those together constitute supporting means A.

Figure 4:
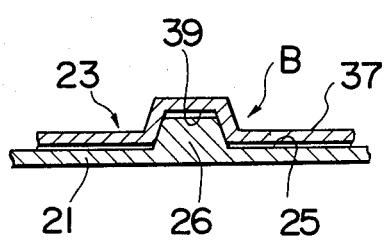
FIG. 4 is a sectional view taken along the line IV—IV in FIG. 3.

As will be later described in detail, the meter 23 is held in position in the recessed wall 24 mainly be three means at the three spots, i.e., the supporting means A, positioning means C and locking means D. The effective support of the meter 23 can be obtained by spacing the supporting means A from the positioning means C and the locking means D as much as possible. As shown in FIG. 4, a groove 39 is formed along the center line of the bottom of the housing 37, which can get in engagement with the guide 26. When the meter 23 is to be fitted, the engagement of the groove 39 with the guide 26 serves to guide the meter 23 in a given direction. Those constitute guide means B for regulating the horizontal position of the meter 23 within the recessed wall 24. The guide means B enables the meter 23 to be automatically fitted.

Referring again to FIG. 3, pawls 41 with their tapered surfaces 40 at their rear ends are formed on the front edge of the bottom of the hood 38 at their right and left positions thereof, respectively, corresponding to the positioning holes 27. When the meter 23 is fitted, the pawls 41 are deflected by the ends 28 defining the holes 27. In this embodiment, the end 28 and the surface 40 constitute deflecting means, and the bottom of the pawl 41 and the hole 27 constitute locating means. In addition, those constitute the positioning means C for preventing the front of the meter 23 from displacing upwards or falling off.

On the right and left of the top wall of the hood 38, projections 42 are protruded upwards at the positions corresponding to the aforesaid engaging members 30. When the projections 42 on the hood 38 pass over the projections 31 on the engaging members 30, the former are locked with the latter. An operation hole 43 is bored on the top of the hood 38 behind each of the projections 42. Those constitute the locking means D.

Figure 5:
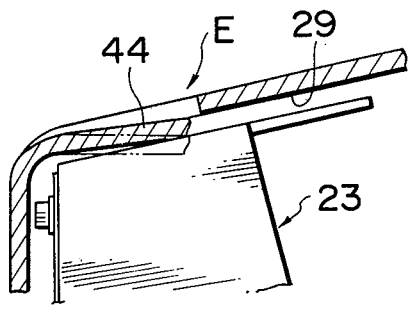
FIG. 5 illustrates a section of a depressing means according to a preferred embodiment of the present invention.

Referring to FIGS. 3 and 5, a flat spring 44 is formed on the top wall 29 at its rear portion. The spring 44 is notched into a tongue-shape and slightly bent downwards. The flat string 44 functions to depress elastically the top of the housing 37 to hold the latter in its position. These constitute depressing means E. Designated as 45 is a terminal provided at the back of the housing 37. The terminal 45 is inserted into the connector 36. Therefore, the position of the terminal 45 is appropriately determined in advance so as to well coincide with that of the connector 36.

In operation, mounting the meter 23 is as simple as merely inserting the meter 23 in the posture as shown in FIG. 3, into the recessed wall 24 through the opening thereof. The meter 23 can be inserted straightforwards into the recessed wall 24, as the guide means B and more particularly the guide 26 fits with the groove 39. Also, the meter 23 is properly positioned in the recessed wall 24 by means of the guide means B. When the meter 23 is thrust into the recessed wall, therefore, the connecting terminal 45 is automatically fitted into the connector 36 fixed on the back wall 33 without any additional manipulation.

When the meter 23 is further thrust, it is locked by the locking means D. The projections 42 first deform the engaging members 30 and then displace the projections 31 thereof upwards, finally moving over the latter. As soon as the projections 42 pass over the projections 31, they are locked each other so as to prevent the meter 23 from sliding forwards or backwards. At that time, regarding the supporting means A, the bottom wall 25 directly supports the bottom of the housing 37. Also, the positioning means C operates at the same time. That is to say, the pawls 41 are fitted into the holes 27 in order to prevent the front of the meter 23 from displacing upwards. In the depressing means E, the flat spring 44 presses down the top of the housing 37, thereby to restrain the upward movement of the rear of the meter 23.

More specifically, the meter 23 is held in the recessed wall 24 mainly at the three spots by the supporting means A, the positioning means C and the locking means D. Such a mechanism enables an extremely stable supporting of the meter 23. As a result, the meter 23 can be securely supported and prevented from falling off, in spite of the vibrations of the instrument panel and/or the meter. Particularly, the displacement of the meter 23 in the vertical direction can be prevented by the actions of the positioning means C and the depressing means E. Its displacement in the lateral direction can be prevented by the functions of the guide means B. Also, the forward-backward movement of the meter's front portion can be prevented by means of the positioning means C and the locking means D.

The meter 23 can be easily detached from the recessed wall 24, by thrusting a finger through the operating holes 43 on the hood 38, and pushing upwards the operating parts 32 on the engaging members 30. Whereupon the engaging members 30 are displaced upwards as illustrated by the chain line in FIG. 3. Consequently, the locking of the projections 31 with the other projections 42 is released, and the meter 23 can be withdrawn from the recessed wall 24.

The locking means D exhibits a so-called self-locking function to enhance the driver's safety in emergency, because the top wall 29 with the projections 31 fixed on the engaging members 30 is inclined. For example, in case a force is executed on the meter 23 to cause its injection toward the driver in such an occasion when the car is struck from behind, a moment is produced in such a direction as can push down the projections 31. Thus the meter 23 is more sufficiently locked. The self-locking function is strengthened when the inclination angle of the top wall 29 is increased.

Figure 6:
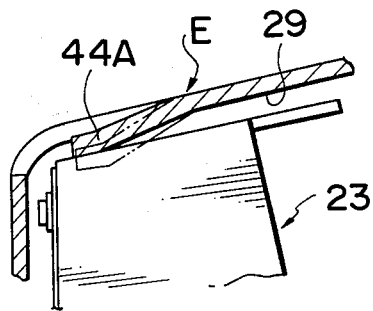
FIG. 6 is a sectional view showing a modified form of depressing means according to another embodiment of the present invention.

FIG. 6 illustrates a modified form of the depressing means E. A flat spring 44A is formed into a tongue-shape, protruding backwards.

Figure 7:
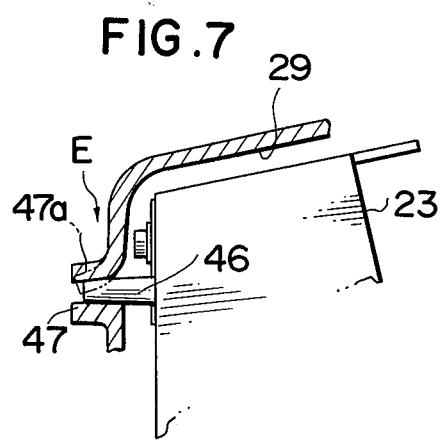
FIG. 7 is a sectional view showing still another modification of the depressing means according to the present invention.

FIG. 7 illustrates another modification of the depressing means E. A projection 46 is fixed on the back of the meter 23. A boss hole 47 is bored on the back of the recessed wall 24 at the position corresponding to that of the projection 46. When the projection 46 fits into the hole 47, the upper portion 47a defining the hole 47 is caused to elastically press down the projection 46 and then the back of the meter 23 toward the bottom of the recessed wall 24.

Figure 8:
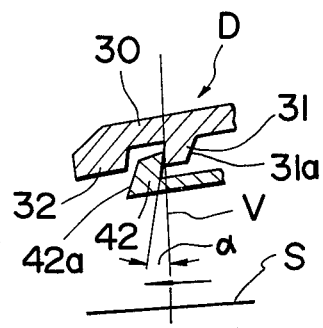
FIG. 8 illustrates a section of locking means according to a preferred embodiment of the present invention.

FIG. 8 is an enlarged view in section showing a portion of the locking means D for explanation of the locking mechanism. In order to increase the locking effect of the projections 31 with the other projections 42, the engaging planes of the projections 42 are preferably given a minor angle α which is one to the direction V perpendicular to the direction S of inserting the meter 23. Also, for facilitating the engaging of the projections 31 with the other projections 42, a taper angle at the front surfaces 31a of the projections 31 and that at the rear end surfaces 42a of the projections 42 may be increased to some extent.

Figure 9:
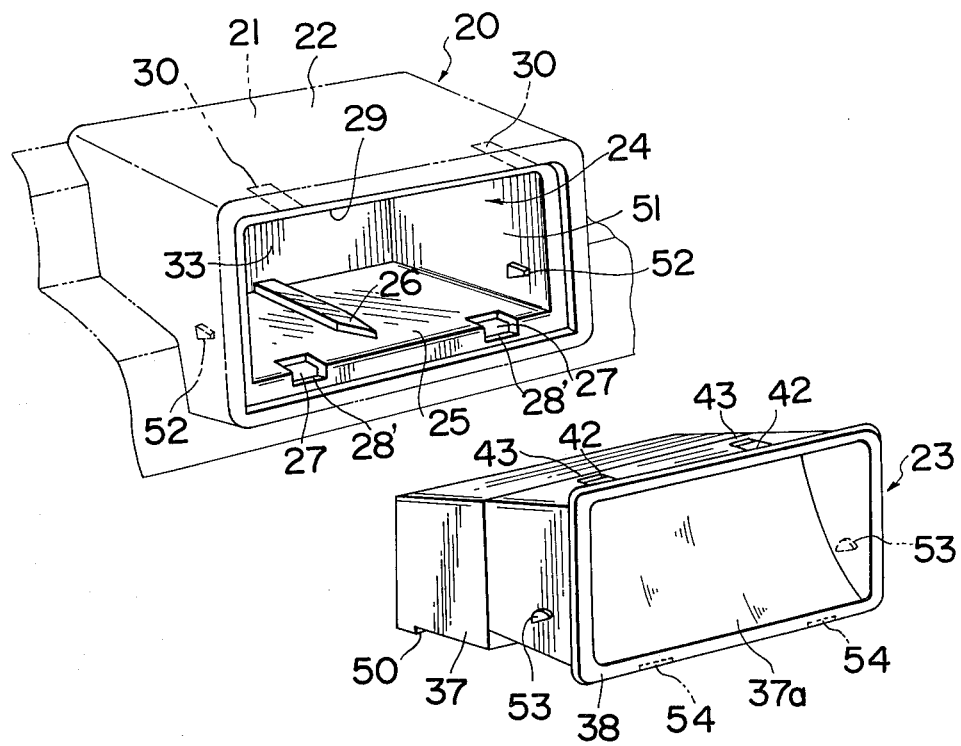
FIG. 9 is a schematic perspective view showing another form of a structure for mounting a meter according to the present invention.
Figure 11:
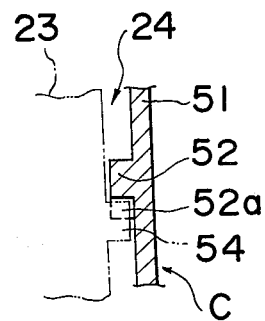
FIG. 11 is a sectional view taken substantially along the line X—X in FIG. 10.
Figure 10:
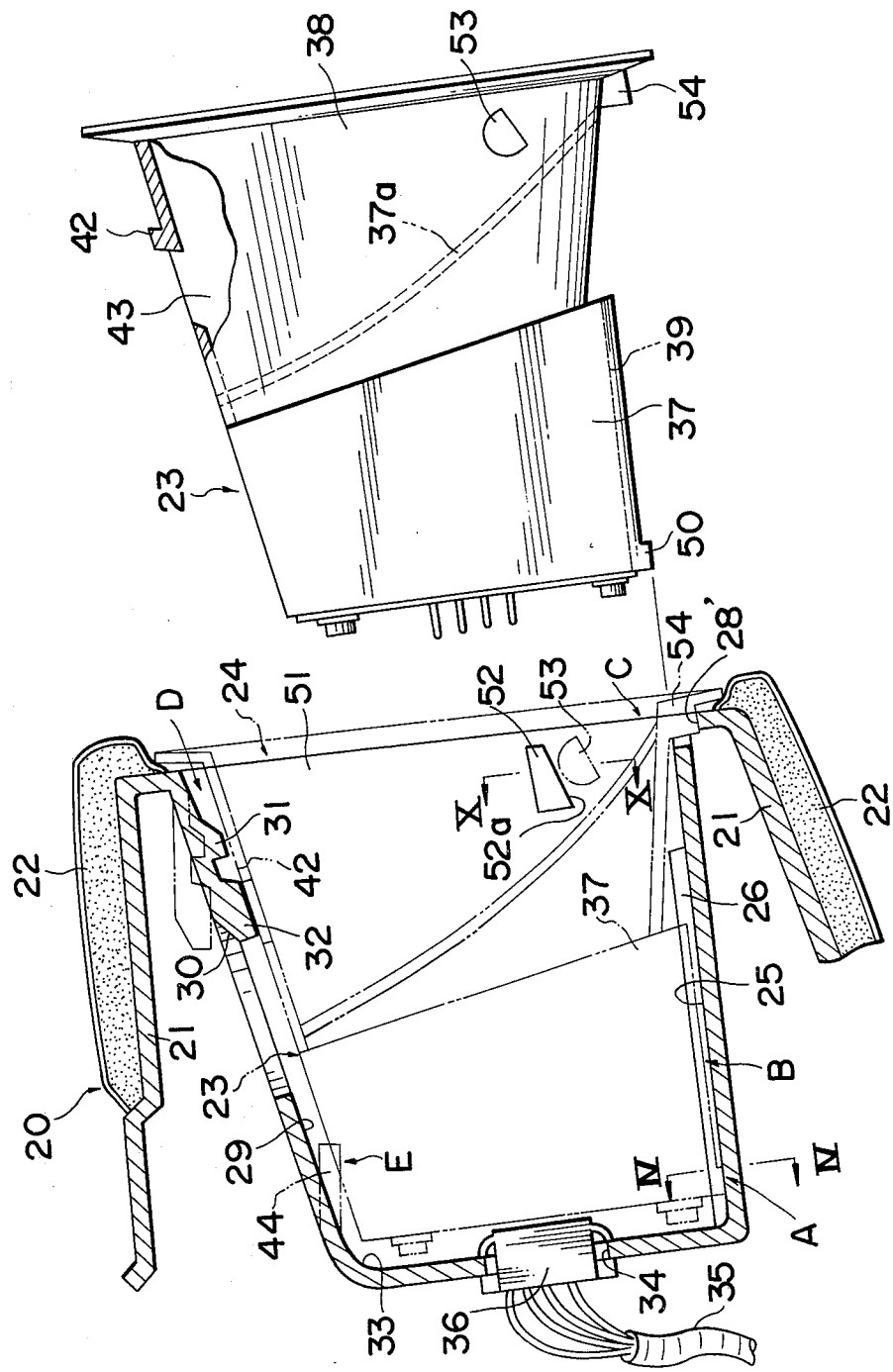
FIG. 10 illustrates a section of the mounting structure as illustrated in FIG. 9.

FIGS. 9 to 11 illustrate another embodiment of the present invention which is similar to the above-mentioned embodiments except the positioning means C. Throughout all views from FIG. 2 to FIG. 11, like reference characters designate like or corresponding parts.

In the embodiment as illustrated in FIGS. 9 through 11, a depressing member 52 is formed integrally with each side wall 51, protruding laterally. The bottom surface 52a of the depressing member 52 is slightly inclined upwards in the direction of the open end of the recessed wall 24, thereby to form a tapered surface of the ends 28' defining the holes 27 which ends 28' function as a locating means in the present embodiment. Projections 53 are provided on the sides of the hood 38 near the front thereof at the positions corresponding to the depressing member 52, respectively. The projections 53 on the side walls of the hood 38 protrude laterally. Preferably the upper surfaces of the projections 53 are curved like a circular arc as illustrated in FIG. 10, by way of example. Two projections 54 protruding downwards are formed on the front edge of the bottom of the meter 23 at the right and left portions thereof. These projections 54 each has a flat bottom surface for directly getting in contact with the ends 28'. The projections 54 do not have an acute-angled portion such as the pawls 41 as illustrated in FIG. 3. For such a reason, the positioning means can be easily moulded in case of the present embodiment.

When the meter 23 is inserted into the recessed wall 24 the projections 54 are supported by the ends 28' while the projections 53 abut against the tapered surface 52a of the depressing member 52. The front of the meter 23 with the projections 53 and 54 is deflected to the ends 28' and the tapered surfaces 52a of the depressing members 52 in a manner similar to a wedge. Accordingly, the front of the meter 23 is prevented from displacing upwards.

As understood from the foregoing description, according to the present invention, a structure for mounting a meter on an instrument panel requires no cumbersome operation but the meter can be simply fitted into a wall recessed on the instrument panel. It is extremely easy to fit the meter on the instrument panel, and still the meter can be very effectively protected from vibrations and falling off even in emergency. Furthermore, the supporting can be strengthened by additionally providing depressing means and guide means. Also, the locking can be easily released to facilitate the mounting and dismounting of the meter.

While the present invention has been particularly shown and described with reference to preferred embodiments thereof, it will be understood by those skilled in the art that the foregoing and other changes in form and details can be made therein without departing from the spirit and scope of the present invention.

What is claimed is:
1. A structure for mounting a meter, comprising:
an instrument panel of a motor vehicle having a wall recessed in said instrument panel at the front thereof;
a meter inserted in said recessed wall through the opening of said recessed wall;
means for supporting said meter on the bottom of said recessed wall, said supporting means including a first projection formed on the front portion of the bottom of said meter, said first projection being adapted to contact the bottom of said recessed wall;
means for positioning said meter at the front portion of said recessed wall, said positioning means including:
a pair of protruding members fixedly formed at the front edge of the bottom of said meter;
means formed at the front edge of the bottom of said recessed wall for receiving said protruding members when said meter is inserted into said recessed wall;
a pair of second and third projections provided on opposite side portions of said meter; and
a pair of depressing members formed on opposite side portions of said recessed wall for depressing said second and third projections toward said receiving means;
means for locking said meter in position within said recessed wall, said locking means including a fourth projection provided on the top of said meter and an engaging member provided at the top of said recessed wall which is resiliently upwardly deformed when said engaging member becomes engaged with or disengaged from said fourth projection;
guide means including a guide provided on the bottom of said recessed wall and a groove so formed in the bottom of said meter that said guide engages with said groove when said meter is inserted into said recessed wall; and
means for depressing said meter toward the bottom of said recessed wall when said meter is in position within said recessed wall, said depressing means including a spring member.

2. The structure of claim 1, wherein the bottom of each of said protruding members is flat, corresponding to the flat top of said receiving means.

3. A structure for mounting a meter, comprising:
an instrument panel of a motor vehicle having a wall recessed in said instrument panel at the front thereof;
a meter inserted into said recessed wall through the opening of said recessed wall;
means for supporting said meter on the bottom of said recessed wall, said supporting means including a first projection formed on the front portion of the bottom of said meter, said first projection being adapted to contact the bottom of said recessed wall;
means for positioning said meter at the front portion of said recessed wall, said positioning means including:
a pair of pawls fixedly formed on the front edge of the bottom of said meter; and
means formed at the front portion of the bottom of said recessed wall for receiving said pawls when said meter is inserted into said recessed wall;
means for locking said meter in position within said recessed wall, said locking means including a second projection protruding upwardly from the top of said meter at a relatively front portion thereof and an engaging member fixed at the top of said recessed wall, said engaging member being resiliently deformed upwardly when said engaging member becomes engaged with or disengaged from said second projection;

guide members including a guide fixed on the bottom of said recessed wall and a groove so formed and positioned in the bottom of said meter that said guide engages with said groove when said meter is inserted into said recessed wall; and means for depressing said meter toward the bottom of said recessed wall when said meter is in position within said recessed wall, said depressing means including a spring means.

4. The structure of claim 1 or claim 3, wherein said spring member is a flat spring fixed on the rear portion of the top of said recessed wall.

5. The structure of claim 1 or claim 3, wherein said spring member includes a projection fixed on the back of said meter and a hole formed in the back of said recessed wall at a position corresponding thereto in such a way that when said projection fits into said hole, the upper portion of said projection elastically depresses said projection together with said meter toward the bottom of said recessed wall.

6. The structure of claim 1 or claim 3, wherein an engaging plane of said fourth projection is oriented at an acute angle perpendicular to the direction of insertion of said meter into said recessed wall.

7. The structure of claim 1 or claim 3, wherein said recessed wall is shaped like a frustrum of pyramid, and the top thereof is slightly inclined donwardly so that said recessed wall is tapered toward its back portion.

8. The structure of claim 1 or claim 3, wherein said guide is strip-shaped and positioned at the center of the bottom of said recessed wall in the direction of insertion of said meter.

9. The structure of claim 6, wherein said engaging member is notched into a tongue shape, protruding toward the back of said recessed wall.

10. The structure of claim 1 or claim 3, wherein said engaging member includes a downward projection at an intermediate position thereof and a thick operating part; a groove being formed between said projection and operating part.

11. The structure of claim 1 or claim 3, wherein said meter includes a hood positioned at the front thereof.

12. The structure of claim 1 or claim 3, further comprising an electric connector fixed at the back side of said recessed wall connected through a harness to a power source and a terminal fixed at the back side of said meter in such a way that said terminal can be automatically inserted into said connector when said meter is inserted into said recessed wall.

* * * * *